(12) United States Patent
Schuster (10) Patent No.: US 6,427,625 B1
(45) Date of Patent: Aug. 6, 2002

(54) APPARATUS FOR MILKING AN ANIMAL

(75) Inventor: Anders Schuster, Horby (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 09/744,399

(22) PCT Filed: Jul. 23, 1999

(86) PCT No.: PCT/SE99/01306
§ 371 (c)(1),
(2), (4) Date: Mar. 14, 2001

(87) PCT Pub. No.: WO00/04768
PCT Pub. Date: Feb. 3, 2000

(30) Foreign Application Priority Data

Jul. 24, 1998 (SE) ................................. 9802614

(51) Int. Cl.$^7$ .................................................. A01J 5/04
(52) U.S. Cl. ................................................... 119/14.47
(58) Field of Search .......................... 119/14.47, 14.53, 119/14.38, 14.01, 14.02, 14.03

(56) References Cited

U.S. PATENT DOCUMENTS

| | | | |
|---|---|---|---|
| 952,122 A | * | 3/1910 | Lane ....................... 119/14.47 |
| 2,744,496 A | | 5/1956 | Roben |
| 5,697,324 A | * | 12/1997 | van der Lely ........... 119/14.08 |
| 5,791,283 A | * | 8/1998 | Schulte .................... 119/14.47 |

FOREIGN PATENT DOCUMENTS

| | | |
|---|---|---|
| EP | 0 513 932 | 11/1992 |
| WO | WO 96/11567 | 4/1996 |

* cited by examiner

*Primary Examiner*—Charles T. Jordan
*Assistant Examiner*—Judith A. Nelson
(74) *Attorney, Agent, or Firm*—Young & Thompson (57) ABSTRACT

The present invention relates to an apparatus for milking an animal comprising a first set of teatcups and a second set of teatcups, said first set of teatcups comprising at least two teatcups of the same size or shape, said second set of teatcups comprising at least two teatcups of the same size or shape, each said teatcups being elongated and comprising a rigid shell and a flexible liner forming a pulsation space, said liner being adapted to receive a teat at one end and to let out extracted milk at a second end. According to the invention the first set of teatcups comprises teatcups of a first size or shape and the second set of teatcups comprises teatcups of a second size or shape, the first size or shape being different from the second size or shape.

21 Claims, 8 Drawing Sheets

APPARATUS FOR MILKING AN ANIMAL

TECHNICAL BACKGROUND

The invention relates to an apparatus for milking an animal comprising a first set of teatcups and a second set of teatcups, said first set of teatcups comprising at least two teatcups of the same size or shape, said second set of teatcups comprising at least two teatcups of the same size or shape. Further the invention relates to an apparatus for milking an animal comprising at least one set of teat cups, which said set of teat cups comprises teatcups of different sizes and shapes, which are elongated and each comprises a rigid shell and a flexible liner forming a pulsation space, said liner being adapted to receive a teat at one end and to let out extracted milk at a second end.

Such an apparatus is known from WO 96/11567, which describes a milking robot provided with two sets of teatcups for allowing cleaning of the first set of teatcups while the second set of teatcups is attached to the teats of an animal.

OBJECT OF THE INVENTION

The object of the present invention is to improve the reliability of said apparatus, and any milking apparatus in general, disregarding whether milking is performed automatically (automatic teatcup attachment and automatic teatcup detachment), semi-automatically (manual teatcup attachment and automatic teatcup detachment), or manually (manual teatcup attachment and manual teatcup detachment).

SUMMARY OF THE INVENTION

This has been solved by the apparatus of the initially defined kind, which is characterised in that each of said teatcups is elongated and comprises a rigid shell and a flexible liner forming a pulsation space, said liner being adapted to receive a teat at one end and to let out extracted milk at a second end, the first set of teatcups comprising teatcups of a first size or shape and the second set of teatcups comprising teatcups of a second size or shape, the first size or shape being different from the second size or shape. Hereby, the teatcups are adapted to differently sized and shaped teats.

Suitably, the liner of said first set of teatcups has a longitudinal extension at the pulsation space, which is different from that of the liner of the second set of teatcups. Furthermore, the shells of the teatcups of said first set of teatcups have a longitudinal extension, which is different from that of the shells of the second set of teatcups. Hereby, the teatcups are adapted to receive teats of different lengths.

Suitably, said liner is provided with a thin, lip-like member, defining an opening of a predetermined diameter, a liner of the first set of teatcups having an opening, which is different from that of the liner of the second set of teatcups. Hereby, the teatcups are adapted to receive teats of different diameters.

Preferably, said lip-like member has a predetermined flexibility, said flexibility of the liner of the first set of teatcups being different from that of the liner of the second set of teatcups. Hereby, the teatcups are adapted to receive teats of different shapes.

Suitably, at least one of said first and second sets of teatcups is provided in a teatcup magazine. Hereby, a defined storage place is provided.

Preferably, said teatcup magazine is provided with a rinsing means. Hereby, the teatcups are allowed to be rinsed after performed milking.

Suitably, a milk meter is connectable via a valve to a teatcup of the first set of teatcups, respectively, each milk meter being connectable via said valve to a teatcup of the second set of teatcups, respectively, said valve allowing either of a teatcup of the first set of teatcups and a teatcup of the second set of teatcups to be connected to the milk meter, respectively. Hereby, a lower number of milk meters is needed. Furthermore, the milk meter is rinsed after each milking, disregarding which set of teatcups having been used.

Preferably, the apparatus further comprises a device for automatically attaching teatcups to the teats of an animal in response to a control means, and an animal identification means associated with said control means, the size of each teat of an animal individual being stored in a memory of said control means, said apparatus being adapted to choose at least one teatcup from either of said first and second sets of teatcups. Hereby, an automatic choice of teatcups is allowed to be performed.

Suitably, said device comprises a robot having a robot arm and a gripper for selectively gripping a teatcup from either of the first and the second sets of teatcups. Hereby, automatic teatcup attachment is allowed to be performed.

Preferably, said device comprises a teatcup identification means. Furthermore, said teatcup identification means device comprises a laser reader, each of said teatcups being provided with a bar code. Hereby, automatic selection and identification of a teatcup is allowed to be performed.

Suitably, the teatcups of said first set of teatcups are connectible to a first claw and the teatcups of said second set of teatcups are connectible to a second claw. Hereby, a lower number of milk tubes is needed.

Furthermore, a kit of parts is provided comprising at least one teatcup of a first size or shape and at least one teatcup of a second size or shape, the first size or shape being different from the second size or shape.

Alternatively, a kit of parts is provided comprising at least one liner for a teatcup of a first size and at least one liner for a teatcup of a second size, the first size being different from the second size.

The object of the invention has also been solved by the apparatus of the initially defined kind, which is characterized in that said set of teat cups comprises at least a first teat cup of a first size or shape and at least a second teat cup of a second size or shape, said first size or shape being different from said second size or shape. Hereby, the teat cups are adapted to differently sized and shaped teats. Two different types of teat sizes and shapes are hereby possible to attach with the teat cups.

Suitably, said set of teat cups comprises teat cups of a third size and shape and said third first size or shape being different from said first and second size or shape. Hereby three different types of teats, regarding their size and shape, are possible to attach.

Preferably, said set of teat cups comprises teat cups of a fourth size and shape and said fourth size or shape being different from said first, second and third size or shape. Hereby four different types of teats, regarding their size and shape, are possible to be attached in a smooth and exact manner. In this way a group of animals and their teats can be attached with a teat cup with a special size and shape. This can also be done to a particular animal with a particular sized and shaped teat.

Furthermore, said apparatus comprises a first and a second set of teat cups and said first set of teat cups is different from the second set of teat cups. Thereby is achieved that a teat cup with a special size and shape can be attached to a teat of a particular animal, of which animal the teat has individual size and shape or that this teat cup can be attached to another animal with the same size and shape.

Suitably, said set of teat cups comprises a plurality of teat cups, and wherein each teat cup has an individually size or shape. Hereby is it possible to attach a teat cup to a large number of different sizes and shapes of the teat. For example, if the set comprises 60 different teat cups, regarding their size and shape, it is possible to attach each teat cup to 60 different teats in an smooth and gentle manner. Of course, some of those animals will have a teat with the same size and shape. That means that a particular teat cup could be used to more than one animal. It means also that the availability is provided in a satisfactory manner. The robot can hereby freely choose a particular teat cup. Service and cleaning could also be performed uncomplicated, since there is a location of the teat cups within one arrangement means

DRAWING SUMMARY

In the following, the invention will be described in more detail with reference to the accompanying drawings, in which.

DETAILED DESCRIPTION

Figures 1A, 1B:
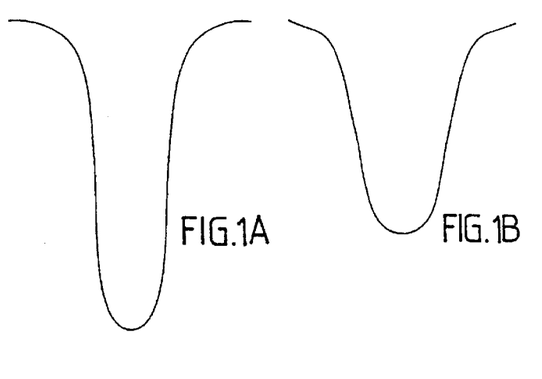
FIGS. 1A and 1B illustrate different sizes and shapes of teats, FIG. 2 schematically illustrates a milking plant according to a first embodiment.

FIG. 1A shows a thin, elongated teat 1, whereas FIG. 1B shows a thick and short teat 1.

Teats are of different configurations depending on i.a. breed, age, number of births. The short teats often have a relatively large diameter, whereas long teats often have a relatively small diameter. However, there are also animals with short and thin teats and other with long and thick teats. Furthermore, there are animal individuals with differently shaped teats, i.e. it may have one or more teats of one size and shape and one or more teats of another size and shape.

Figure 2:
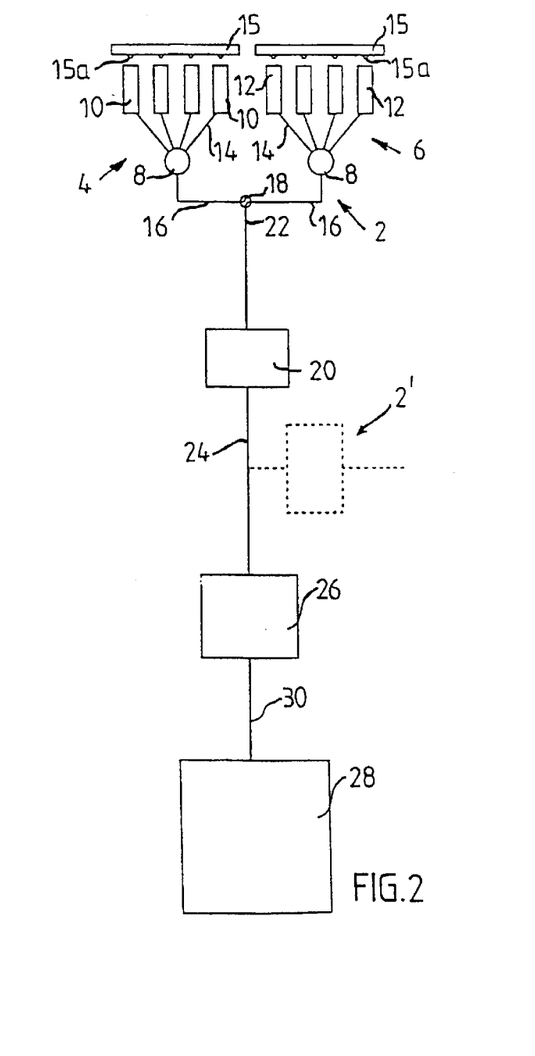

FIG. 2 shows schematically a milking plant comprising a plurality of milking equipments 2 according to a first embodiment of the invention. Each milking equipment comprises a first set of teatcups 4 and a second set of teatcups 6, each in the form of a milking cluster. Each milking cluster is provided with a claw 8, to which teatcups 10, 12 are connected via a tubing 14.

Each set of teatcups 4, 6 is provided with a rinsing means 15 provided with a rinsing nozzle 15a for each teatcup.

In order to fit different sizes of teats, the teatcups 10 are of a size or shape, which is larger than that of the teatcups 12. Different sizes or shapes of the teatcups will be further discussed below in connection with FIGS. 4A–4D, 5A–5F and 6.

A tubing 16 connects the claw 8 to a three-way valve 18, which in turn is connected to a milk meter 20 via a tubing 22. A tubing 24 connects the milk meter 20 to a receiver 26, which in turn is connected to a milk tank 28 via a tubing 30.

A further milking equipment 2' (shown in broken lines) may be connected to the tubing 24 (or to the tubing 30).

A person who is to manually attach teatcups to the teats of an animal chooses between the first set of teatcups and the second set of teatcups, depending on the size or shape of the teats of that animal. The teatcups 10 should then be attached to the teats of an animal having relatively large sized or shaped teats, whereas the teatcups 12 should be attached the teats of animal having relatively small sized or shaped teats. The valve 18 is set to connect the utilised set of teatcups 4 or 6 to a source of vacuum (not shown).

After performed milking, the teatcups of the set of teatcups 4, 6 that have been used are rinsed as well as the thereto belonging tubing 16. The milk meter 20 is rinsed disregarding which set of teatcups has been utilised.

Figure 3:
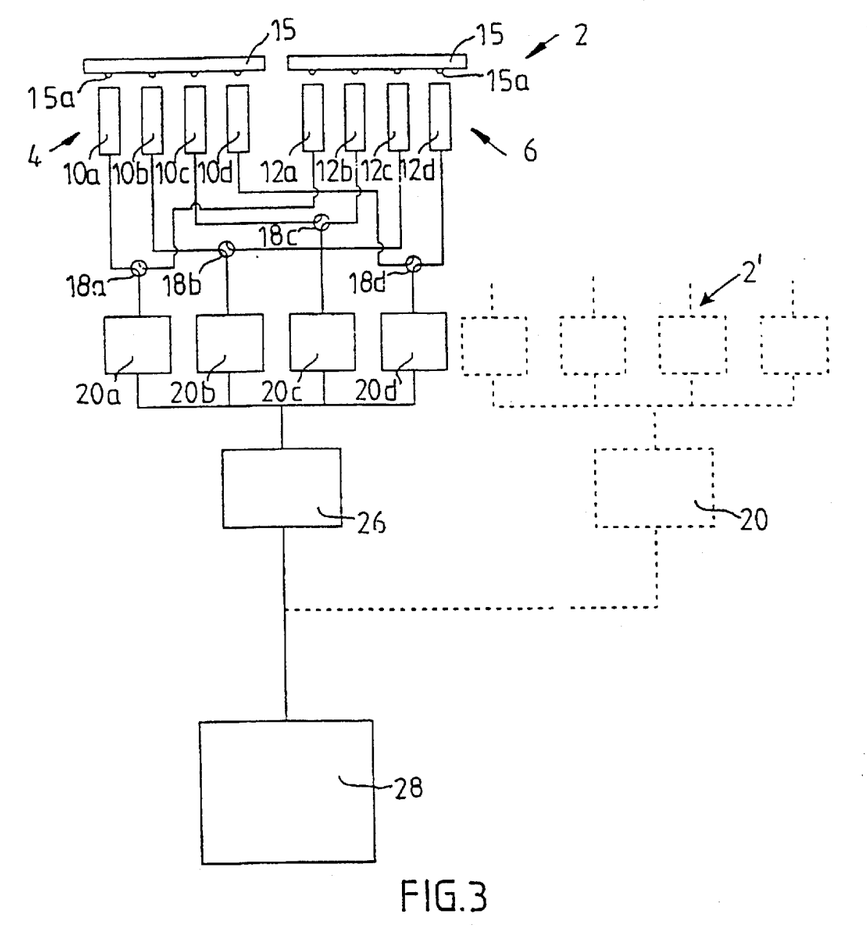
FIG. 3 illustrates a milking plant according to a second embodiment.

FIG. 3 illustrates schematically a milking plant, comprising a plurality of milking equipments 2 according to a second embodiment of the invention. Each milking equipment comprises a first set of teatcups 4 and a second set of teatcups 6. The first set 4 has teatcups 10a, 10b, 10c, 10d of a larger size or shape Man the teatcups 12a, 12b, 12c, 12d of the second set of teatcups 6, in order to fit different sizes or shapes of teats. The teatcups 10a and 12a are connected to a milk meter 20a via a three-way valve 18a. The teatcups 10b and 12b are connected to a milk meter 20b via a three-way valve 18b etc. Each teatcup is connectible to a rinse jetter 15a of a rinsing means 15.

Each milk meter 20a, 20b, 20c, 20d is connected to a receiver 26, which in turn is connected to a milk tank 28.

A further milking equipment 2' (shown in broken lines) may be connected to the tubing leading to the tank 28.

A person who is to attach teatcups to the teats of an animal chooses between teatcups 10a, 10b, 10c and 10d of the first set of teatcups 4 and teatcups 12a, 12b, 12c and 12d of the second set of teatcups 6, depending on the size or shape of each one of the teats of that animal. A teatcup 10a, 10b, 10c or 12d should then be attached to a relatively large sized or shaped teat, whereas a teatcup 12a, 12b, 12c or 12d should be attached a relatively small shaped or sized teat. In the figure, the teatcups 10a, 10b, 12c and 12d have been chosen for milking an animal. Accordingly, the valves 18a and 18b have been set to connect the teatcups 10a and 10b to the milk meters 20a and 20b, respectively, whereas the valves 18c and 18d have been set to connect the teatcups 12c and 12d to the milk meters 20c and 20d.

After performed milking, the teatcups having been used for milking are rinsed. The milk meters are cleaned at every rinsing operation. A valve (not shown) may be provided between the receiver 26 and the tank 28 for avoiding rinsing liquid to be fed into the tank 28.

Figure 4A:
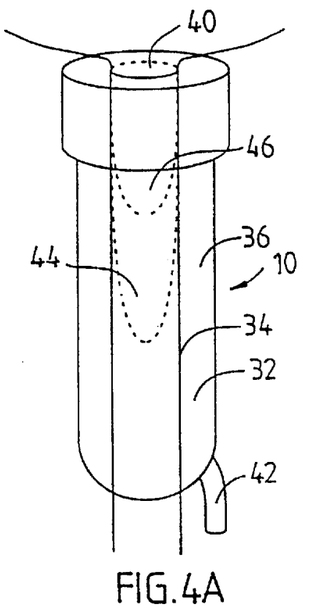
FIGS. 4A to 4D illustrate a teatcup comprising a shell and a liner.

FIG. 4A shows a teatcup during a so called milking phase, i.e. while milk is extracted from the teat. The same pressure (vacuum) prevails in the teat space 38 and in the pulsation chamber 36.

The relatively long teatcup 10 comprises a relatively long shell 32. A liner 34 is detachably connected to the shell 32.

A pulsation chamber 36 is defined between the liner 34 and the shell 32. The liner itself forms a teat space 38 and a teat introduction opening 40.

Figure 5A:
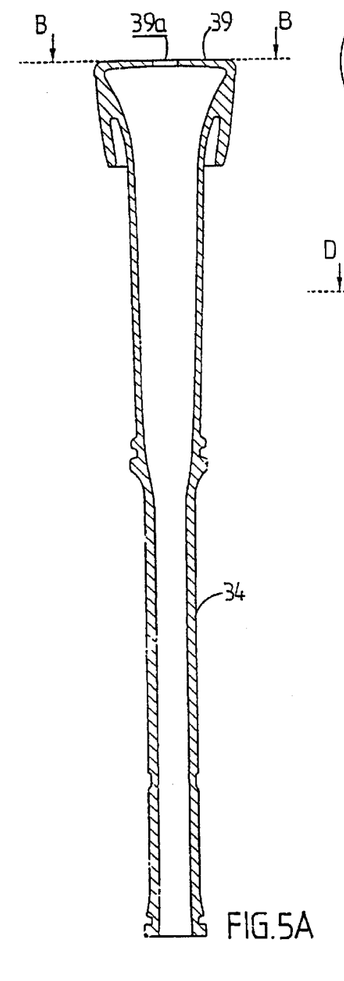
FIGS. 5A to 5F illustrate a liner.
Figure 5B:
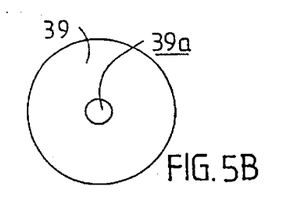

The pulsation chamber 36 is connectible via a connection piece 42 to a pulsating source of vacuum (not shown), whereas the teat space 38 is connected to a milking vacuum via a short milk tube 44, which may be an integrated part of the liner 34 (cf. FIG. 5A).

A long teat 44 and a short teat 46 are indicated with broken lines, respectively.

Figure 4B:
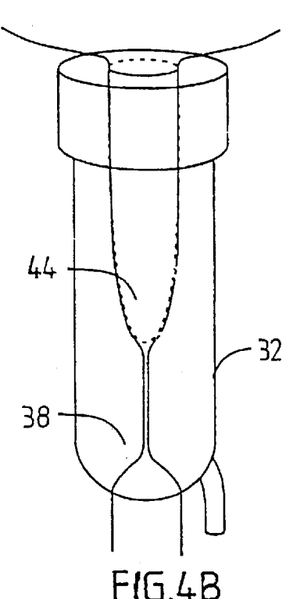
Figure 4C:
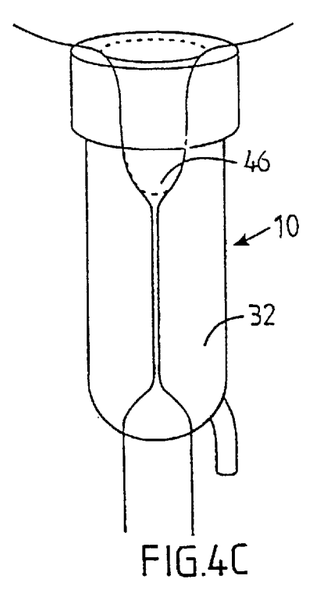
Figure 4D:
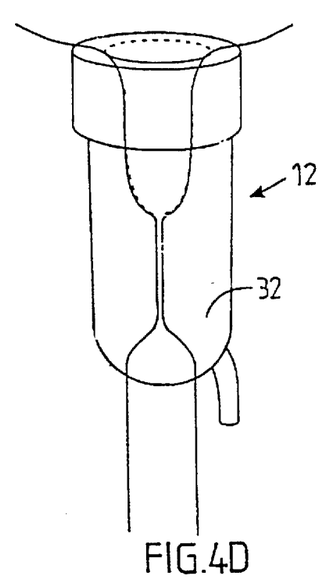

FIG. 4B shows a teatcup during the so called massage phase, i.e. the liner is in a collapsed state due to atmospheric pressure in the pulsation chamber 36 and vacuum in the teat space 38. A long teat 44 is introduced into the teat space 38 of the long teatcup 10. FIG. 4C shows a short teat 46 introduced into the long teatcup 10. FIG. 4D shows a short teat 46 introduced into a short shell 32, together forming a short teatcup 12 with a short teat space 38.

A long teat in a too small teatcup may be uncomfortable for the animal, whereas a too small teat in a long teatcup may cause bad attachment due to leakage of air into the teatcup. In such cases, the animal may try to kick the teatcup off the teat.

FIG. 5A shows a liner 34 to be inserted into a teatcup shell 32. The liner 34 is provided with a so called lip 39, i.e. a relatively thin wall at the upper end of the liner. The lip 39 defines an opening 39a of a relatively small diameter for fitting thin teats (cf. FIG. 5B).

Figures 5C, 5D:
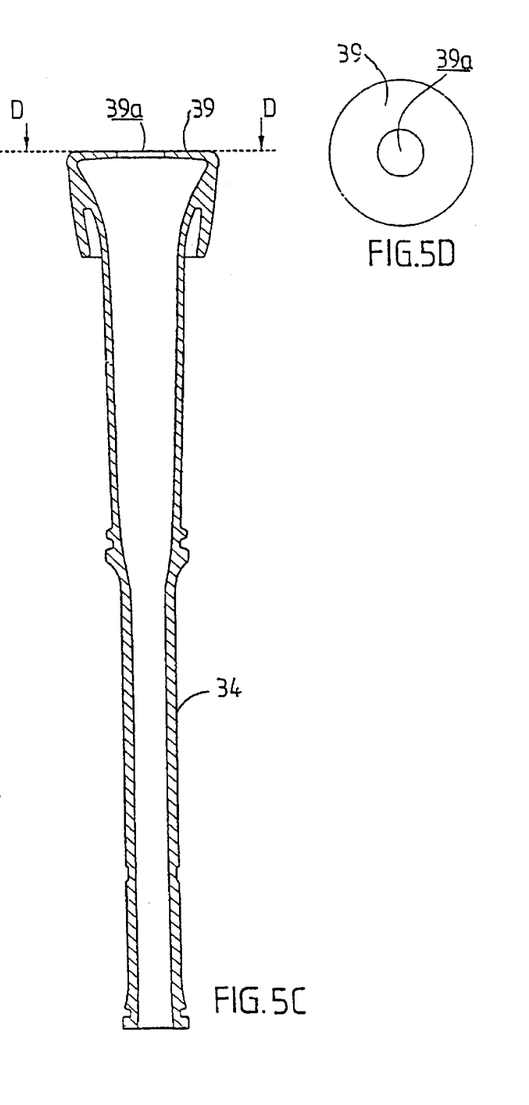

FIG. 5C shows a liner 34, which is provided with a lip 39 defining an opening 39b, which is adapted to receive teats of a relatively normal diameter (see also FIG. 5D).

Figure 5E:
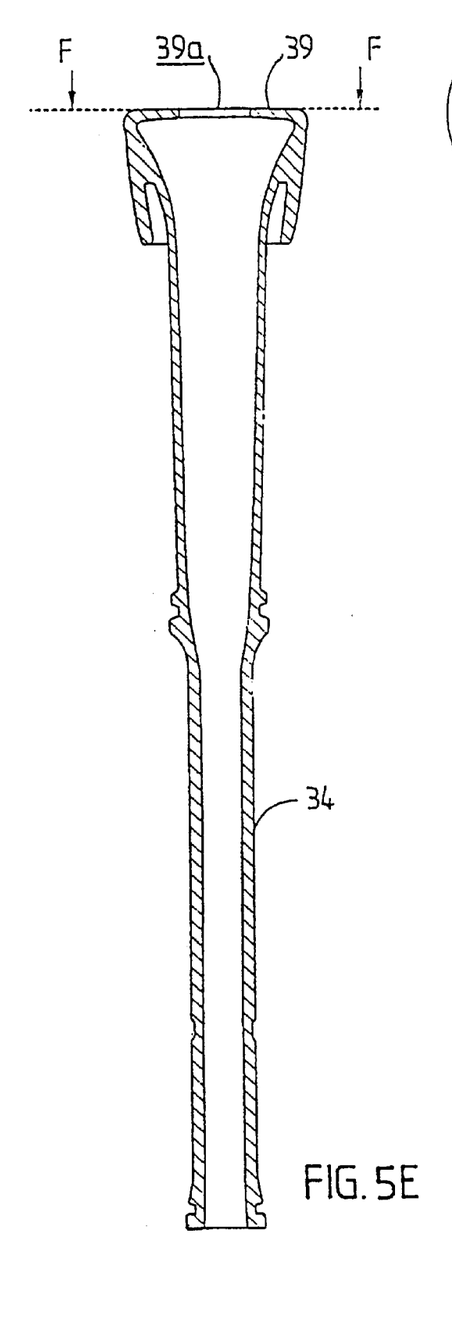
Figure 5F:
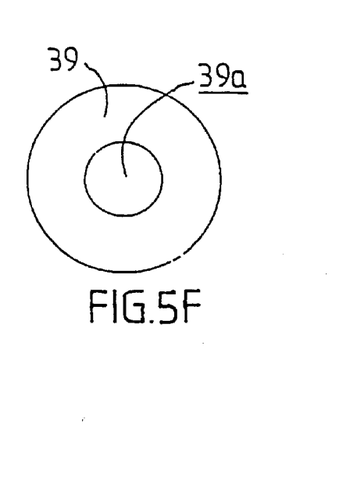

FIG. 5E shows a liner 34, the lip 39 of which defines an opening, which has a large diameter for receiving relatively thick teats.

A teat introduced into a liner having a too large opening 39a may be uncomfortable for the animal, as it may cause leakage of air into the teatcup, which may be uncomfortable for the animal. In such cases, the animal may try to kick the teatcup off the teat.

Figure 6:
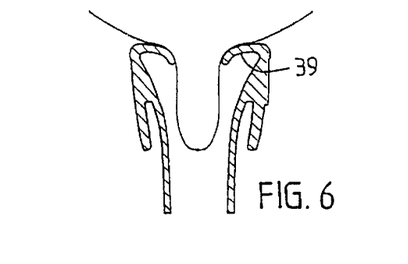
FIG. 6 illustrates a liner with inserted teat.

FIG. 6 is a cross-section of a liner 34 with an introduced teat. The lip 39 flexes as the teat is drawn towards into the interior if the liner 38.

In order to fit a teat of a particular size or shape, the flexibility of the lip 39 is varied in different liners. Accordingly, a teat of a small diameter (cf. FIG. 1A) requires a lip of less flexibility than a teat of large diameter (cf. FIG. 11), for avoiding leakage of air between the teat and the teatcup.

It should be noted that in order to cover all kinds of sizes and shapes of teats, the liners 34 having different openings 39a, 39b, 39c, may each be provided with a lip low or high flexibility. Furthermore, any liner 34 of such a combination of size of opening 39a, 39b, 39c and flexibility of lip 39 may be made for different lengths of of shells 32.

Figure 7:
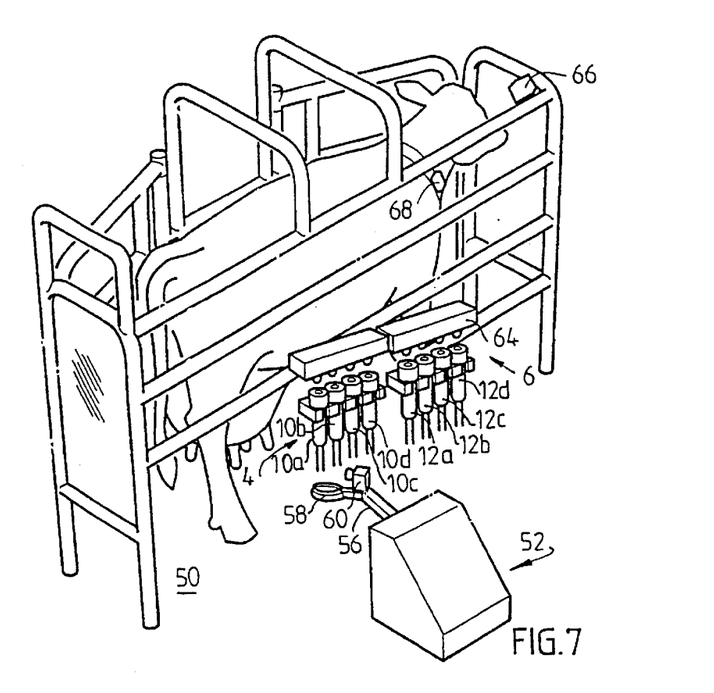
FIG. 7 is a perspective view of an automatic milking plant.

FIG. 7 shows an animal stall 50 provided with a milking robot 52, having a robot arm 56 and a gripper 58. A teat locating means 60, such as a video camera, a laser sensor or an ultrasonic sensor is provided on the robot arm 56.

In accordance with the second embodiment (cf. FIG. 2) a teatcup magazine 62 comprising the first set of teatcups 4, and a teatcup magazine 64 comprising the second set of teatcups 6 is provided at the animal stall 50. Each teatcup magazine 62, 62 is provided with a rinsing means 15.

The valves 18a, 18b, 18c, 18d, the milk meters 20a, 20b, 20c, 20d, the receiver 26 etc. have been omitted from FIG. 4 for clarity reasons, but are of course included in the manner illustrated in FIG. 2.

An animal that enters the animal stall 50 is identified by a transponder reader 66 arranged at the animal stall for reading a transponder 68 arranged on a belt around the neck of the animal. In a memory of a control means (not shown), the sizes of each teat of the each animal individual is stored.

The control means of the robot 52 is programmed to perform teatcup attachment in a particular order, e.g. the rear left teat first, then the front left teats, then the rear right teat and last the front right teat. The robot arm thus fetches from one of the magazines 62, 64 a teatcup suitable for each teat, regarding its size and shape, i.e. a long teatcup or a short teatcup, and/or a teatcup with a liner 34 having a suitable opening 39a, 39b, 39c and/or a teatcup having a liner provided with lip 39 of a desired flexibility.

Figure 8:
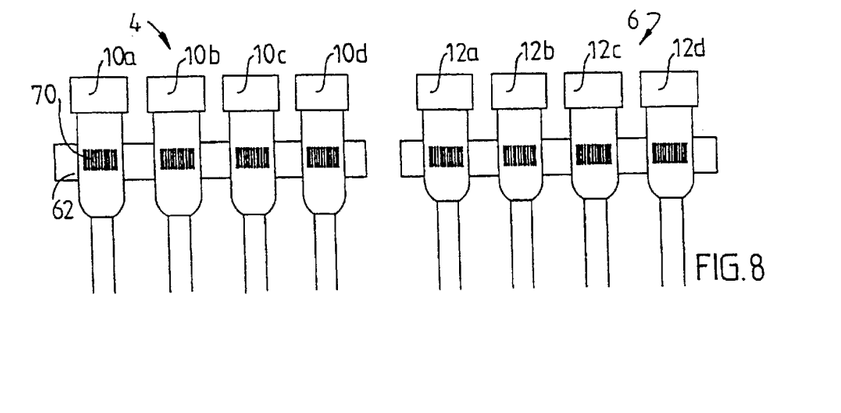
FIG. 8 illustrates a teat cup with identification means.

In order to allow identification of each teatcup 10a, 10b, 10c, 10d, 12a, 12b, 12c, 12d, a bar code 66 is provided on each of them (see FIG. 8). The teat locating means 60 comprises a laser reader, which is adapted to identify each teatcup.

Alternatively, the teatcups may be marked by means of a colour code. In this case, the teatcups are identified by viewing by means of a video camera, and analysing the captured image by colour (RGB) analysis.

Of course, it is not enough with two sets of teatcups for all the different kinds of teatcups described above. However, the farmer performs an analysis regarding the sizes and shapes of the animals on the farm in question and chooses two sizes or shapes suitable for the animals on that farm.

Figure 9:
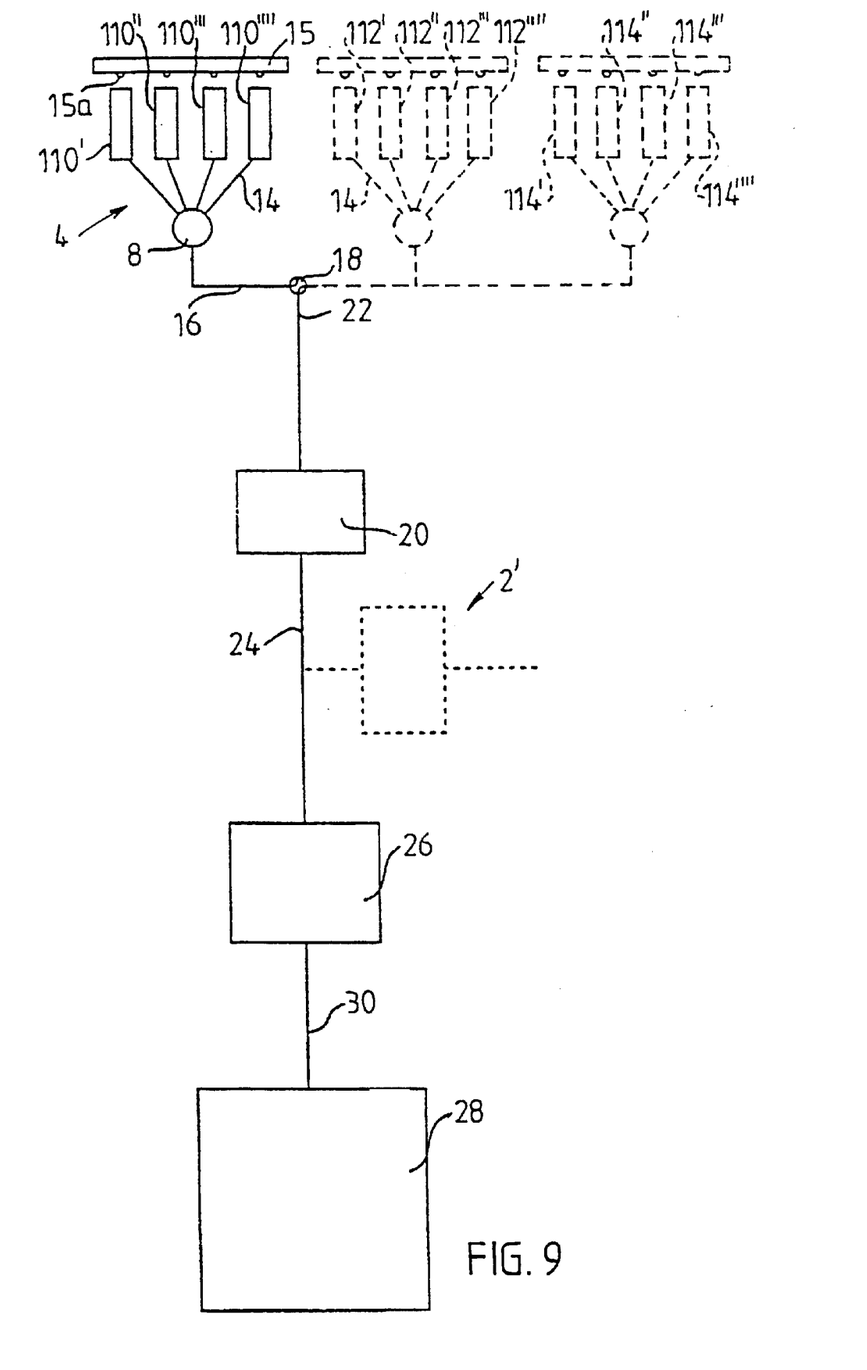
FIG. 9 illustrates a milking plant with a number of sets of teat cups.

FIG. 9 shows an example of the invention, in which parts denoted with a reference sign correspond to parts of the above described figures. FIG. 9 illustrates a milking plant with a number of sets of teat cups with different sizes and shapes. In the figure just one set of teat cups is illustrated with unbroken lines and further two sets with dotted lines. The teatcups 110', 110", 110''', 110''''; 112', 112", 112''', 112'''';

114', 114", 114''', 114'''' are in the FIG. 9 illustrated with the same size and shape, but are according to this invention with different sizes and shapes.

Figure 10:
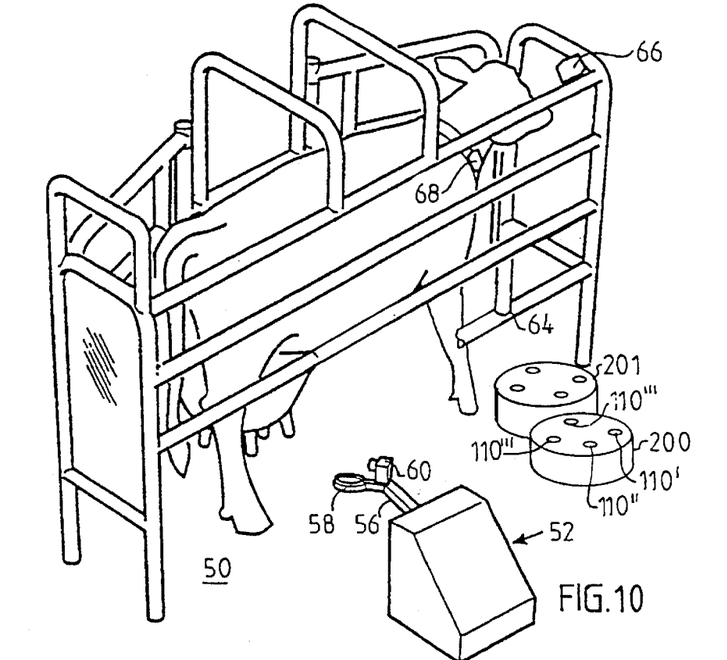
FIG. 10 illustrates a perspective view of an automatic milking plant with two sets.

FIG. 10 shows an example of the invention, in which parts denoted with a reference sign correspond to parts of FIG. 7. FIG. 10 shows an animal stall 50 provided with a milking robot 52. In accordance with this embodiment two sets 200, 201 of teat cups 110', 110", 110''', 110''''; 112', 112", 112''', 112''''are provided at the animal stall 50. Both sets are in this embodiment designed as two rotary teat cup magazines 200, 201. Of course may other designs of the magazines be useful to achieve the object of the invention. The set of teat cups could also be arranged in a rack, in which the teat cups could be shifted automatically, depending on what particular teat cup which should be attached to the teat of the animal.

Hereby four different types of teats, regarding their size and shape, are possible to be attached in a smooth and exact manner. In this way a group of animals and their teats can be attached with a teat cup with a special size and shape. This can also be done to a particular animal with a particular sized and shaped teat.

Figure 11:
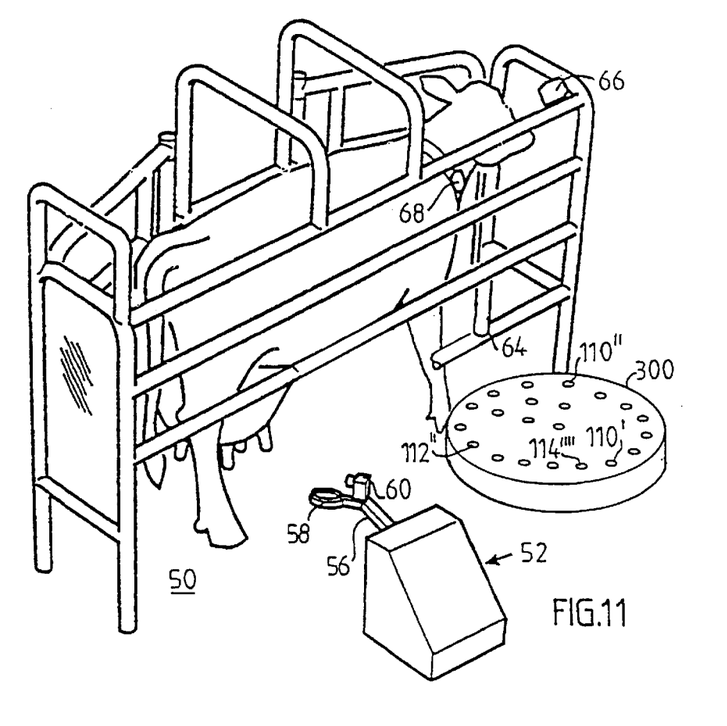
FIG. 11 illustrates a perspective view of an automatic milking plant with one set comprising a plurality of teat cups.

Teats are of different configurations depending on i.a breed, age, number of births etc. There is therefore a large variation of sizes or shapes of the teats as described above. It is hereby possibly to provide the animal stall with a plurality of sets. For example, a herd with 60 animals may result an installation of 60 sets. But since the sizes and shapes of the teats of some animal are similar, may be just 30 sets is needed to be installed FIG. 11 illustrates a perspective view of an automatic milking plant with one set comprising a plurality of teat cups. In the FIG. 11, in which parts denoted with a reference sign correspond to parts of FIG. 7, the set is a big flat rotary teat cup magazine 300. The magazine comprises a large number of teat cups 110', 110", 110''', 110''''; 112', 112", 112''', 112''''; 114', 114", 114''', 114'''' with different sizes and shapes (for clarity reasons not all teat cups in the figure have a reference sign). Of course may other designs of the magazine be useful to achieve the object of the invention.

In a memory of a control means (not shown), the sizes of each teat of the each animal individual is stored. A storage of data could be done for each animal. A transponder 68 is in the figure arranged on a belt around the neck of the animal. By measuring the herd of animals a number of different data concerning the sizes and shapes of the animal teat could be stored in said memory.

For example, if the set comprises 40 different teat cups, 40 teats with different sizes and shapes (that is 10 animal, for example cows) could be attached with a teat cup with a different size and shape. Of course some animals have teats which have the similar size and shape. This means that, maybe just 20 different teat cups could be attached to the teats to the 10 animals.

Above, reference has been made to an animal. It should be understood that lactating animal, such as a cow, a sheep, a goat, a buffalo or a horse is meant.

What is claimed is:

1. An apparatus for milking an animal comprising a first set of teatcups and a second set of teatcups, said first set of teatcups comprising at least two teatcups of the same size or shape, said second set of teatcups comprising at least two teatcups of the same size or shape, characterised in that each of said teatcups is elongated and comprises a rigid shell and a flexible liner forming a pulsation space, said liner being adapted to receive a teat at one end and to let out extracted milk at a second end, the first set of teatcups comprises teatcups of a first size or shape and the second set of teatcups comprises teatcups of a second size or shape, the first size or shape being different from the second size or shape.

2. An apparatus according to claim 1, wherein the liner of said first set of teatcups has a longitudinal extension at the pulsation space, which is different from that of the liner of the second set of teatcups.

3. An apparatus according to claim 1, wherein the shells of the teatcups of said first set of teatcups have a longitudinal extension, which is different from that of the shells of the second set of teatcups.

4. An apparatus according to claim 1, wherein said liner is provided with a thin, lip-like member, defining an opening of a predetermined diameter, a liner of the first set of teatcups having an opening, which is different from that of the liner of the second set of teatcups.

5. An apparatus according to claim 4, wherein said lip-like member has a predetermined flexibility, said flexibility of the liner of the first set of teatcups being different from that of the liner of the second set of teatcups.

6. An apparatus according to claim 1, wherein at least one of said first and second sets of teatcups is provided in a teatcup magazine.

7. An apparatus according to claim 6, wherein said teatcup magazine is provided with a rinsing means.

8. An apparatus according to claim 1, wherein a milk meter is connectible via a valve to a teatcup of the first set of teatcups, respectively, each milk meter being connectible via said valve to a teatcup of the second set of teatcups, respectively, said valve allowing either of a teatcup of the first set of teatcups and a teatcup of the second set of teatcups to be connected to the milk meter, respectively.

9. An apparatus according to claim 1, wherein it further comprises a device for automatically attaching teatcups to the teats of an animal in response to a control means, and an animal identification means associated with said control means, the size of each teat of an animal individual being stored in a memory of said control means, said apparatus being adapted to choose at least one teatcup from either of said first and second sets of teatcups.

10. An apparatus according to claim 9, wherein said device comprises a robot having a robot arm and a gripper for selectively gripping a teatcup from either of the first and the second sets of teatcups.

11. An apparatus according to claim 9, wherein said device comprises a teatcup identification means.

12. An apparatus according to claim 11, wherein said teatcup identification means device comprises a laser reader, each of said teatcups being provided with a bar code.

13. An apparatus according to claim 1, wherein the teatcups of said first set of teatcups are connectible to a first claw and the teatcups of said second set of teatcups are connectible to a second claw.

14. A kit of parts for the apparatus according to claim 1 comprising at least one teatcup of a first size or shape and at least one teatcup of a second size or shape, the first size or shape being different from the second size or shape.

15. A kit of parts for the apparatus according to claim 1 comprising at least one liner for a teatcup of a first size and at least one liner for a teatcup of a second size, the first size being different from the second size.

16. An apparatus for milking an animal comprising at least one set of teat cups, which are elongated and each comprises a rigid shell and a flexible liner forming a pulsation space, said liner being adapted to receive a teat at one end and to let out extracted milk at a second end, characterised in that said set of teat cups comprises at least a first teat cup of a first size or shape and at least a second teat cup of a second size or shape, said first size or shape being different from said second size or shape.

17. An apparatus according to claim 16, wherein said set of teat cups comprises teat cups of a third size and shape, said third first size or shape being different from said first and second size or shape.

18. An apparatus according to claim 16, wherein said set of teat cups comprises teat cups of a fourth size or shape, said fourth size or shape being different from said first, second and third size or shape.

19. An apparatus according to claim 16, wherein said apparatus comprises a first and a second set of teat cups and said first set of teat cups is different from the second set of teat cups.

20. An apparatus according to claim 16, wherein said apparatus comprises a plurality of sets of teat cups, each set has individually sized and shaped teat cups and said teat cups in each individual set of teat cups differ from said teat cups in another set of teat cups.

21. An apparatus according to claim 16, wherein said set comprises a plurality of teat cups, each teat cup has an individually size or shape.

* * * * *